April 30, 1968 M. M. SONDHI 3,381,091

APPARATUS FOR DETERMINING THE PERIODICITY AND APERIODICITY OF A COMPLEX WAVE

Filed June 1, 1965 3 Sheets-Sheet 1

INVENTOR
M. M. SONDHI
BY Jules P. Kirsch
ATTORNEY

United States Patent Office 3,381,091 Patented Apr. 30, 1968

3,381,091

APPARATUS FOR DETERMINING THE PERIODICITY AND APERIODICITY OF A COMPLEX WAVE

Man M. Sondhi, Princeton, N.J., assignor to Bell Telephone Laboratories, Incorporated, New York, N.Y., a corporation of New York Filed June 1, 1965, Ser. No. 460,100
5 Claims. (Cl. 179—1)

ABSTRACT OF THE DISCLOSURE

In a pitch detector, to enhance the determination of periodicity, certain formant peaks are suppressed by center-clipping the speech wave using a conventional peak detector and a gating circuit which, for the duration of successive sampling intervals, passes only those peaks greater in absolute amplitude than a threshold level established as a linear function of the maximum absolute amplitude occurring within that interval.

This invention relates to the transmission of human speech in coded form, and in particular to systems for transmitting human speech in coded form in order to conserve transmission channel bandwidth.

Conventional speech communication systems, for example, commercial telephone systems, typically convey human speech by transmitting an electrical facsimile of the acoustic waveform produced by a human talker. Because of the redundancy of human speech, however, facsimile transmission is a relatively inefficient way to transmit speech information, and it is well known that the information contained in a typical speech sound may be transmitted over a channel of substantially narrower bandwidth than that required for facsimile transmission of the speech waveform.

A number of arrangements for compressing or reducing the amount of bandwidth employed in the transmission of speech information have been proposed, and several of these arrangements have been described in an article by E. E. David, Jr., entitled, "Signal Theory in Speech Transmission," vol. CT3, IRE Transactions on Circuit Theory, page 232 (1956). In these arrangements, a speech wave is analyzed to determine its significant characteristics, and coded information regarding these characteristics is transmitted instead of the speech wave itself to a distant receiver station where a synthetic speech wave is reproduced from the coded information. Since the coded information requires a relatively small amount of transmission bandwidth, these bandwidth compression arrangements effect a substantial reduction in the amount of bandwidth required to transmit the information content of a speech wave.

In general, a different set of speech characteristics is represented in coded form in each of these bandwidth compression systems, but there is one speech characteristic that is typically included in most sets of coded speech characteristics. This characteristic is the so-called pitch characteristic, and it describes the nature of the excitation that is applied to the talker's vocal tract to produce different speech sounds. Thus the pitch characteristic is descriptive of the fact that the voiced sounds of human speech are produced by exciting the resonances of the vocal tract with quasi-periodic puffs of air released from the lungs into the vocal tract by the glottis or vocal cords, whereas the unvoiced sounds of humna speech are produced by the passage of turbulent air through constrictions in the vocal tract.

A number of proposals have been made for automatically measuring and encoding the pitch characteristic, an example of which is described in G. Raisbeck Patent 2,908,761, issued Oct. 13, 1959. In determining the pitch characteristic, a speech wave is typically analyzed to determine two features of the pitch characteristic: first, the wave is analyzed to determine whether the wave is periodic, thereby representing a voiced sound, or aperiodic, thereby representing an unvoiced sound; second, if the wave is periodic, the periodicity of the wave is measured and encoded.

In practice, however, automatic detection and encoding of the pitch characteristic has not been sufficiently accurate, as evidenced by the unnatural quality of the synthetic speech produced in systems depending upon measurement of the pitch characteristic. Although arrangements such as the voice-excited vocoder described in M. R. Schroeder Patent 3,030,450, issued Apr. 17, 1962, avoid this problem by transmitting excitation information in the form of a relatively wide portion or baseband of the original speech wave, this solution requires a greater amount of bandwidth to transmit excitation information than the coded representation of the pitch characteristic.

An investigation of the difficulties in accurately determining the pitch characteristic directly from the speech waveform has revealed that one of the principal factors is the influence of the characteristics of the vocal tract upon the speech waveform. Specifically, it has been determined that the resonances or formants of the vocal tract produce oscillations of substantial magnitude in the speech waveform, and that it is these formant-induced oscillations that prevent accurate determination of periodicity directly from the speech waveform.

In the arrangement provided by the present invention, formant-induced oscillations in the speech waveform are suppressed before the periodicity of the waveform is determined. Suppression is accomplished by so-called center-clipping, in which oscillations that fall below a clipping level are eliminated from the speech waveform. The clipping level is set at a predetermined percentage of the maximum absolute value of the waveform within a specified time interval. By dividing the speech wave into successive time intervals of sufficiently short duration, the predetermined percentage of maximum absolute value will produce a clipping level whose value will fluctuate with naturally occurring variations in overall speech level. In this manner, the clipping level is automatically adjusted so that the same relative portion of the speech wave is removed during each time interval. The center-clipping arrangement of this invention makes it possible to determine with a high degree of accuracy the pitch characteristic of the speech waveform from the center-clipped version of the waveform, and this accuracy is reflected in the naturalness of synthetic speech reproduced from the resulting coded pitch characteristic developed in this invention.

The invention will be fully understood from the following detailed description of illustrative embodiments thereof taken in connection with the appended drawings, in which.

Figure 3A:
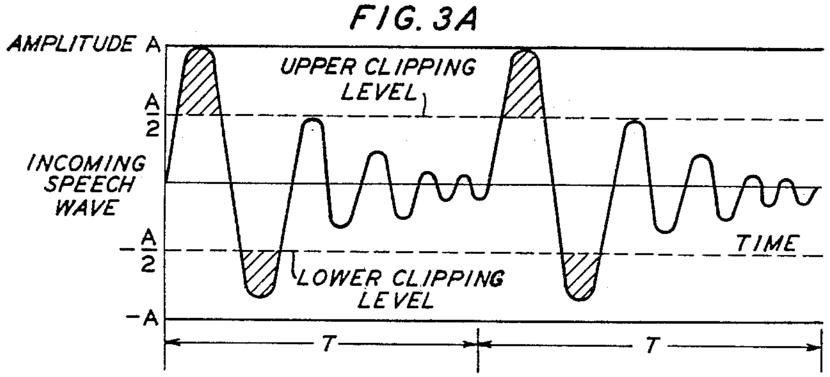
Figure 3B:
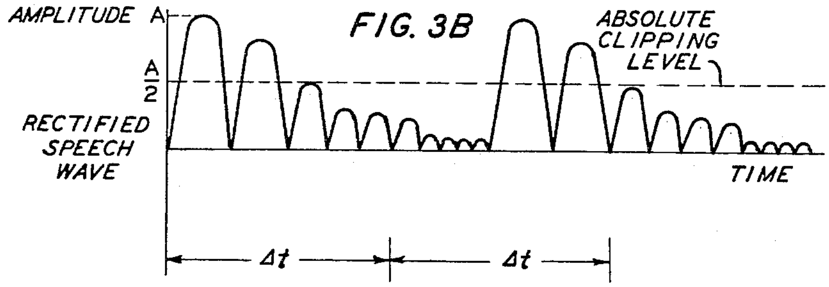
Figure 3C:
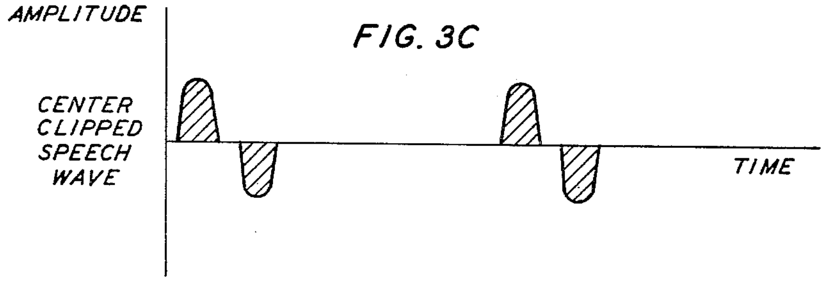
Figure 4A:
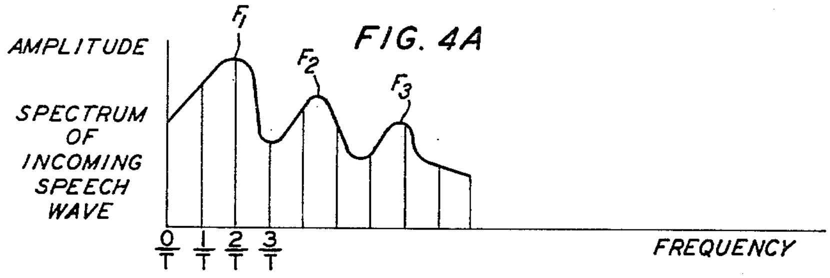
Figure 4B:
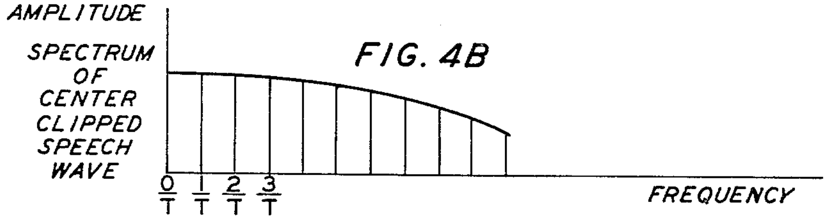

FIGS. 3A, 3B, and 3C are idealized waveform diagrams, which are of assistance in explaining the principles of this invention; and FIGS. 4A and 4B are simplified spectrum diagrams which are of assistance in explaining the principles of this invention.

Referring first to FIGS. 3A and 4A, FIG. 3A illustrates in simplified form a portion of the waveform of a voiced periodic speech sound with period T and FIG. 4A illustrates the spectrum of such a sound. The principal peaks in the spectral envelope, denoted $F_1$, $F_2$, and $F_3$, represent the formants of resonances of the human vocal tract, while the uniformly spaced vertical lines at multiples of the fundamental speech frequency $1/T$ represent harmonic speech components. It is observed in FIG. 3A that each period of the waveform is characterized by a number of oscillations, one which is larger in magnitude, denoted A, than any of the other oscillations. It has been determined that the smaller oscillations in each speech period are attributable to the formants of the vocal tract, just as the peaks in the spectral envelope in FIG. 4A are attributable to vocal tract formants. As explained in the copending application of E. E. David, Jr., et al., Ser. No. 460,101, filed on the same date as this application, suppression of the manifestations of formants in human speech greatly improves the accuracy with which the periodicity of the speech waveform is detected. In the present invention, formant suppression is achieved by center clipping, that is, as shown in FIG. 3A, by removing that portion of the speech waveform which lies within a predetermined level, say $\pm A/2$, on either side of the time axis. FIG. 3C illustrates the center clipped version of the waveform shown in FIG. 3A, in which it is observed that most oscillations in each period are removed and that only the shaded portions of the larger oscillations in the wave in FIG. 3A are preserved in the center-clipped wave in FIG. 3C. It is important to observe that the center-clipped wave in FIG. 3C has the same periodicity as the original wave in FIG. 3A from which it is derived. Equally important, although not illustrated, the center-clipped wave is aperiodic when the original wave is aperiodic. FIG. 4B shows the spectrum of the center-clipped wave in FIG. 3C, it being noted that center clipping suppresses formant peaks to produce a relatively flat spectral envelope.

Figure 1:
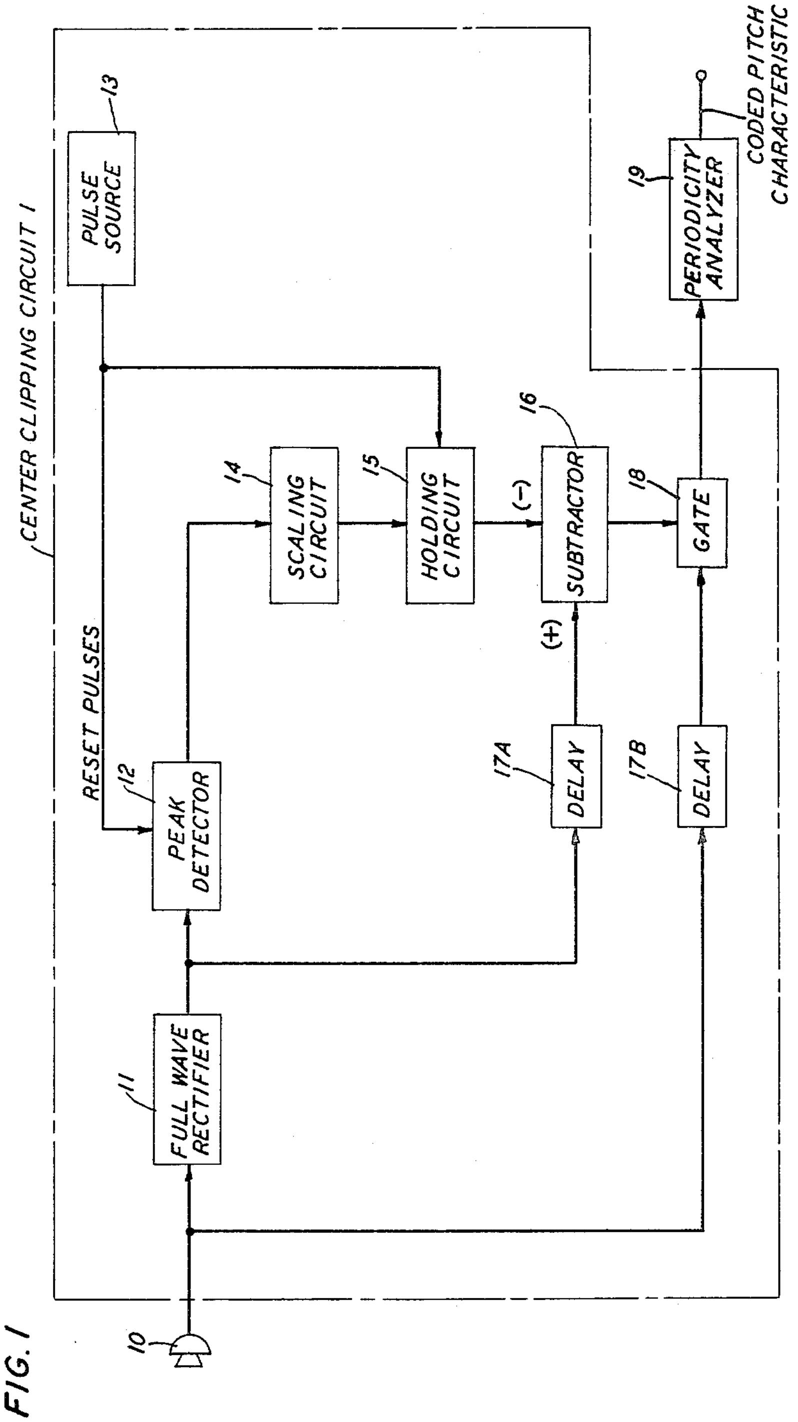
FIG. 1 is a schematic block diagram showing an arrangement for determining the pitch characteristics of a speech waveform in accordance with the principles of this invention.
Figure 2:
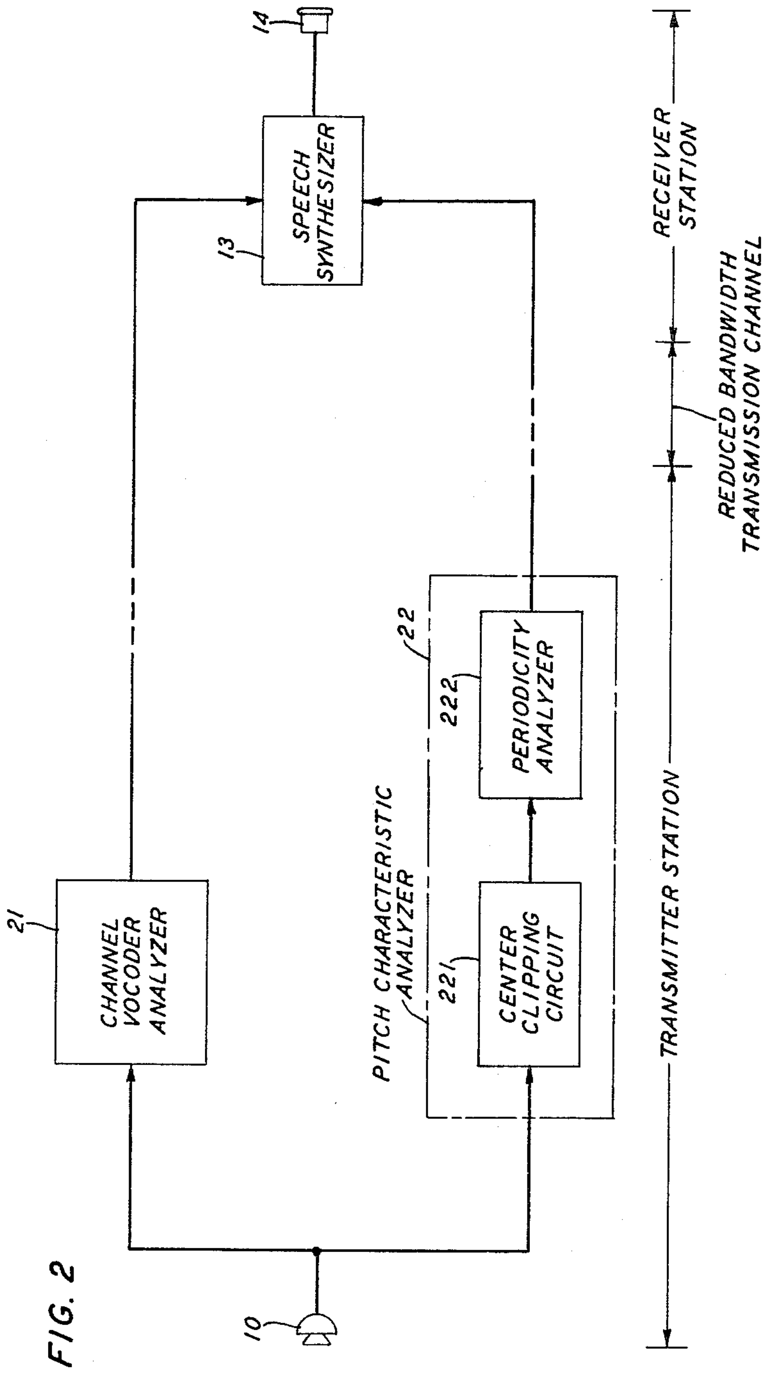
FIG. 2 is a schematic block diagram showing a bandwidth compression system incorporating the apparatus of this invention.

Referring now to FIG. 2, the apparatus of this invention is shown incorporated in a bandwidth compression communication system, for example, a channel vocoder system of the type described in H. W. Dudley in Patent 2,151,091, granted Mar. 21, 1939. At the transmitter station, an incoming speech wave from transducer 10, which may be a conventional microphone, is applied in parallel to channel vocoder analyzer 21 and pitch characteristic analyzer 22. Analyzer 21 derives from the incoming speech wave a number of so-called channel control signals representing in coded form the amplitudes of selected harmonics components of the incoming speech wave, while analyzer 22 derives a coded, information bearing signal representing the pitch characteristic of the incoming speech wave. Analyzer 22 comprises a center-clipping circuit 221 followed by a periodicity analyzer 22. Circuit 221 is illustrated in detail in FIG. 1, and analyzer 222 may be any one of a number of well-known devices for determining the periodicity or aperiodicity of an applied signal; for example, analyzer 222 may be of the autocorrelation variety described in the above-mentioned Raisbeck patent. Circuit 221 derives a center-clipped version of the speech waveform, such as that shown in FIG. 3C, and analyzer 222 derives from the center-clipped output signal of circuit 221 a coded pitch control signal representative of the pitch characteristic of the incoming speech wave. The pitch control signal and the channel control signals from analyzer 21 are transmitted over a reduced bandwidth transmission channel to a receiver station where they are utilized in a conventional speech synthesizer 13 to form a synthetic speech wave which is a natural sounding replica of the incoming speech wave. Reproducer 14, for example a conventional loudspeaker, converts the synthetic speech wave into audible speech sounds.

Turning next to FIG. 1, this drawing illustrates a preferred embodiment of the center-clipping arrangement of this invention. An incoming speech wave from transducer 10 is applied to a full wave rectifier 11 in order to derive a rectified version of the incoming speech wave, as illustrated in FIG. 3B. The rectified speech wave is delivered to a conventional peak detector 12, and peak detector 12, which is controlled by reset pulses from pulse source 13, determines the magnitude of the largest peak that occurs in the uniform sampling interval $\Delta t$ between successive reset pulses. A suitable sampling interval $\Delta t$ between successive reset pulses may be on the order of 10 milliseconds, although it is to be understood that other intervals may also be employed. The maximum absolute value measured by peak detector 12 within the sampling interval preceding each reset pulse is passed to holding circuit 15 by way of scaling circuit 14 upon occurrence of a reset pulse at the end of each sampling interval. Scaling circuit 14, which may be a conventional potentiometer, reduces the maximum absolute value measured by detector 12 by a predetermined amount, for example by one-half, so that the signal delivered to holding circuit 15 at the end of each sampling interval represents the clipping level for that interval, that is, a selected percentage of the maximum absolute value detected by detector 12 during that sampling interval.

The signal passed from detector 12 to circuit 15 is retained in circuit 15 until the occurrence of the next reset pulse from source 13, and during each sampling interval the magnitude of the retained signal in circuit 15 is subtracted from the magnitude of the rectified speech wave from rectifier 11 in subtractor 16, the rectified speech wave having been delayed by delay element 17A by a constant amount of time equal to the sampling interval. In this manner the retained signal in holding circuit 15 is subtracted from that portion of the rectified speech wave from which the retained signal was derived. As shown in the drawing, by subtracting the value of the retained signal from the magnitude of the rectified signal, the output signal developed by subtractor 16 is positive only during those portions of each sampling interval when oscillations in the speech wave have an absolute value greater than a selected percentage of the maximum absolute valve determined during each sampling interval.

The output terminal of subtractor 16 is connected to the control terminal of a conventional transmission gate 18, and the incoming speech wave from transducer 10 is delivered by way of delay element 17B to the input terminal of gate 18. Delay element 17B delays the incoming speech wave for a time equal to the sampling interval so that the speech wave applied to the input terminal of gate 18 is in synchrony with the difference signal from subtractor 16 applied to the control terminal of gate 18. Gate 18 is operated only when the output signal of subtractor 16 is positive, thereby indicating that the absolute value of the speech wave exceeds the selected percentage of the maximum absolute value retained in circuit 15. Hence only those portions of oscillations in the speech waveform that exceed this selected percentage or absolute clipping level are passed through gate 18. The portion of the wave passed by gate 18 and shown in FIG. 3C forms the center clipped version of the speech wave developed by this invention which is delivered from circuit 221 to analyzer 222 in the apparatus shown in FIG. 2. It is observed in comparison of FIGS. 3A and 3C that center clipping removes that portion of the original speech wave which lies between the upper and lower clipping levels, since the only portions of the speech wave that are passed by gate 18 are those portions of oscillations having an absolute value greater than the absolute value of the clipping level.

Although this invention has been described in terms of detecting the pitch characteristic of a speech wave, it is to be understood that applications of the principles of this invention are not limited to the field of speech communication, but include other fields in which it is desired to determine the periodicity of a complex wave. In addition, it is to be understood that the above-described embodiments are merely illustrative of the numerous arrangements that may be devised for the principles of this invention by those skilled in the art without departing from the spirit and scope of the invention.

What is claimed is:

1. Apparatus for determining the pitch characteristic of an incoming speech wave which comprises means for dividing said speech wave into a succession of segments of selected uniform duration, means for measuring the maximum absolute value of said speech wave during each of said segments, means for subtracting a selected percentage of the maximum absolute value of the speech wave during each segment from the absolute value of said speech wave during each segment, gating means under the control of said subtracting means and supplied with said incoming speech wave for transmitting only those portions of the speech wave having absolute values that exceed said selected percentage of said maximum absolute value of said speech wave during each segment to obtain a center clipped signal, and means for detecting the periodicity of said center clipped signal to derive a coded signal representative of the pitch characteristic of said speech wave.

2. Apparatus for determining the pitch characteristic of an incoming speech wave, which comprises means for detecting the maximum absolute value of said incoming speech wave within each of a succession of sampling intervals of predetermined uniform length, means for subtracting the absolute value of said incoming speech wave within each of said sampling intervals from a selected percentage of said maximum absolute value detected during the corresponding sampling interval to derive a control signal indicative of the oscillations of said speech wave during each sampling interval which have an absolute value that exceeds said selected percentage of the maximum absolute value detected during the corresponding sampling interval, means responsive to said control signal for removing from the oscillations of said speech wave during each sampling interval those portions that have an absolute value equal to or less than said selected percentage of said maximum absolute value detected during each sampling interval to form a center clipped version of said speech wave, and means for analyzing the periodicity of said center clipped version of said speech wave to determine said pitch characteristic.

3. Apparatus for analyzing a complex waveform characterized by periodic and aperiodic oscillations, which comprises means for removing from successive specified segments of said complex waveform that portion of each of said oscillations in each segment which has an absolute value equal to or smaller than a predetermined fraction of the maximum absolute value of said oscillations during said segment to form a center clipped version of said complex waveform in which only oscillations in said segment, with an absolute value greater than said predetermined fraction are preserved, and means for detecting the periodicity and aperiodicity of said center clipped version of said complex waveform.

4. Apparatus for determining the pitch characteristic of a speech wave characterized by time-varying periodic and aperiodic oscillations which comprises means for determining the maximum absolute value of said oscillations within successive segments of specified duration of said wave, means for removing from each oscillation in each segment that portion of each oscillation which is equal to or smaller than a selected fraction of the maximum absolute value determined for said segment to form a center clipped version of said wave, and means for detecting the periodicity and aperiodicity of said center clipped version of said wave to determine said pitch characteristic.

5. Apparatus for determining the pitch characteristic of a speech wave characterized by time-varying periodic and aperiodic oscillations, wherein said oscillations reflect the influences of both the periodicity and aperiodicity of the excitation characteristic and the formants of the vocal tract characteristic of the talker producing said speech wave, which comprises means for suppressing those of said oscillations due to the formants of said vocal tract characteristic by center clipping said speech wave, including means for determining the maximum absolute value of said oscillations within successive segments of specified duration of said wave, means for removing from each oscillation in each segment that portion of each oscillation which is equal to or smaller than a selected fraction of the maximum absolute value determined for said segment to form a center clipped version of said wave, and means for detecting the periodicity and aperiodicity of said center clipped version of said wave to determine said pitch characteristic.

References Cited

UNITED STATES PATENTS

| | | |
|---|---|---|
| 2,891,111 | 6/1959 | Flanagan. |
| 2,699,464 | 1/1955 | Di Toro et al. |

KATHLEEN H. CLAFFY, *Primary Examiner.*

R. P. TAYLOR, *Assistant Examiner.*